July 11, 1950  R. E. BOULTON  2,514,622
SIDE DELIVERY SHOVEL ATTACHMENT FOR TRACTORS
Filed March 15, 1948  4 Sheets-Sheet 2
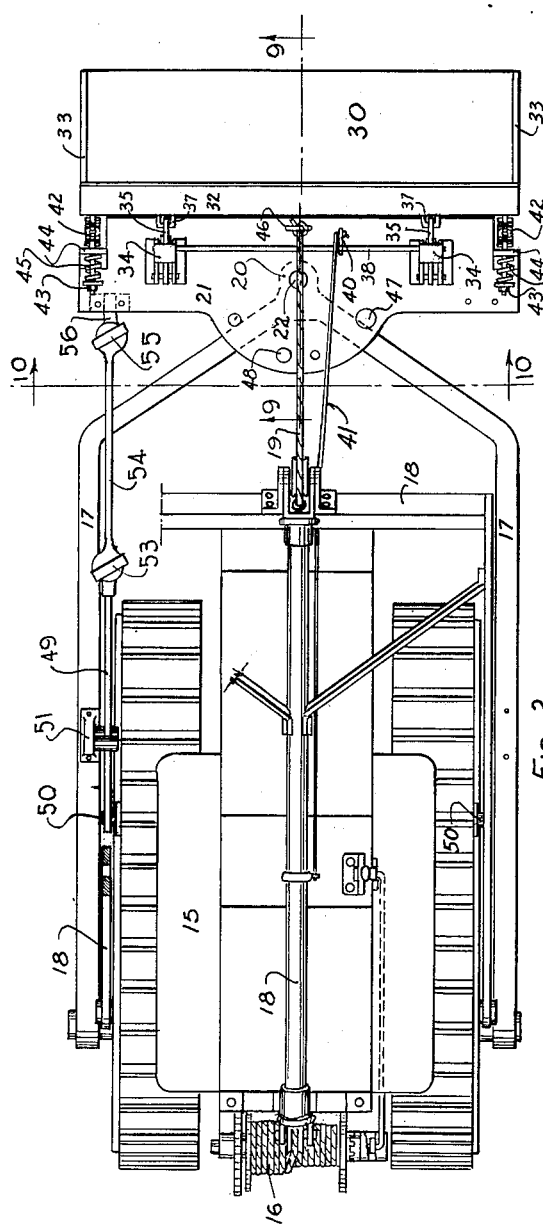
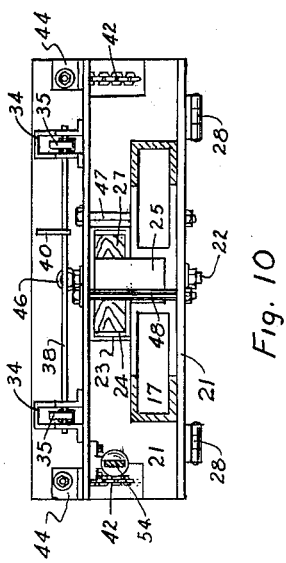
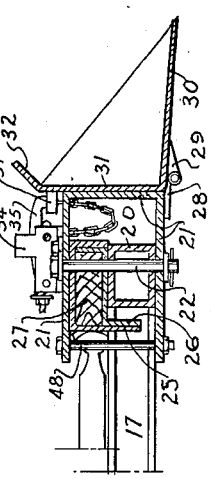
INVENTOR.
ROBERT E. BOULTON
BY
ATTORNEY

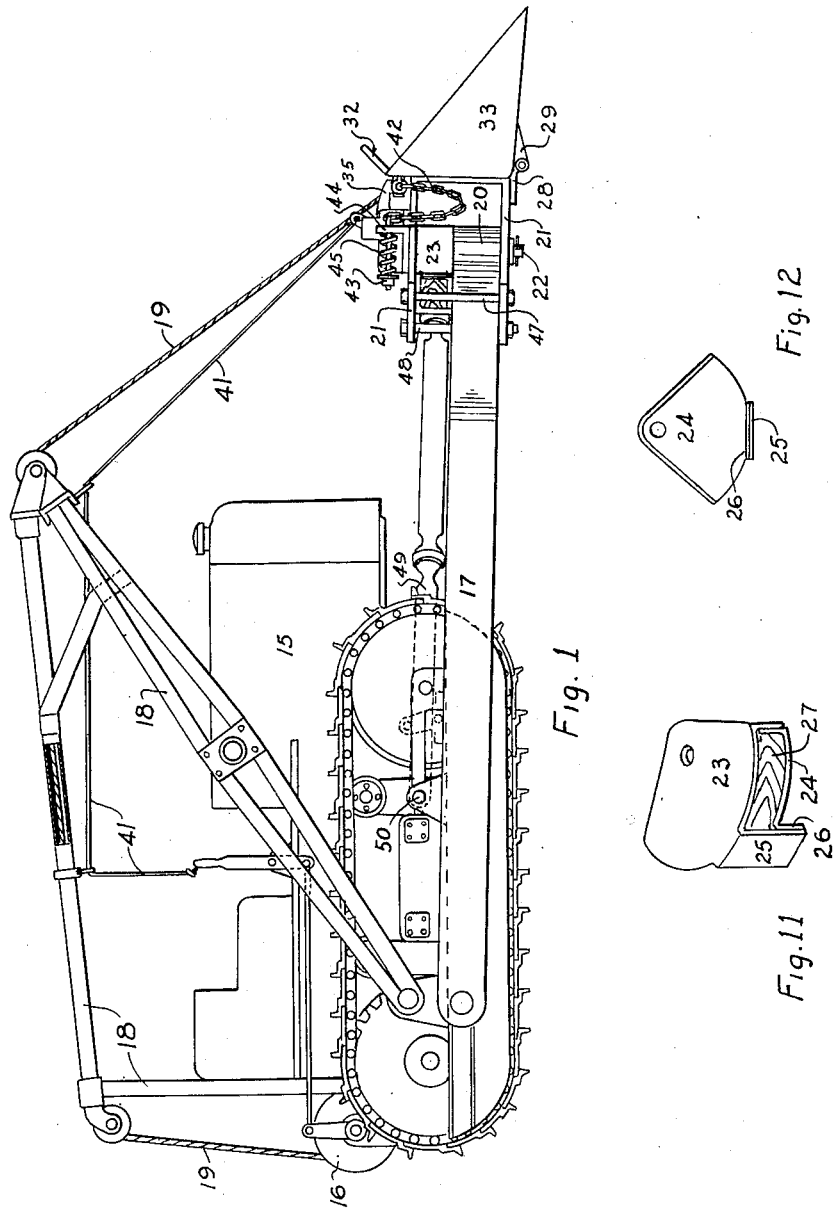

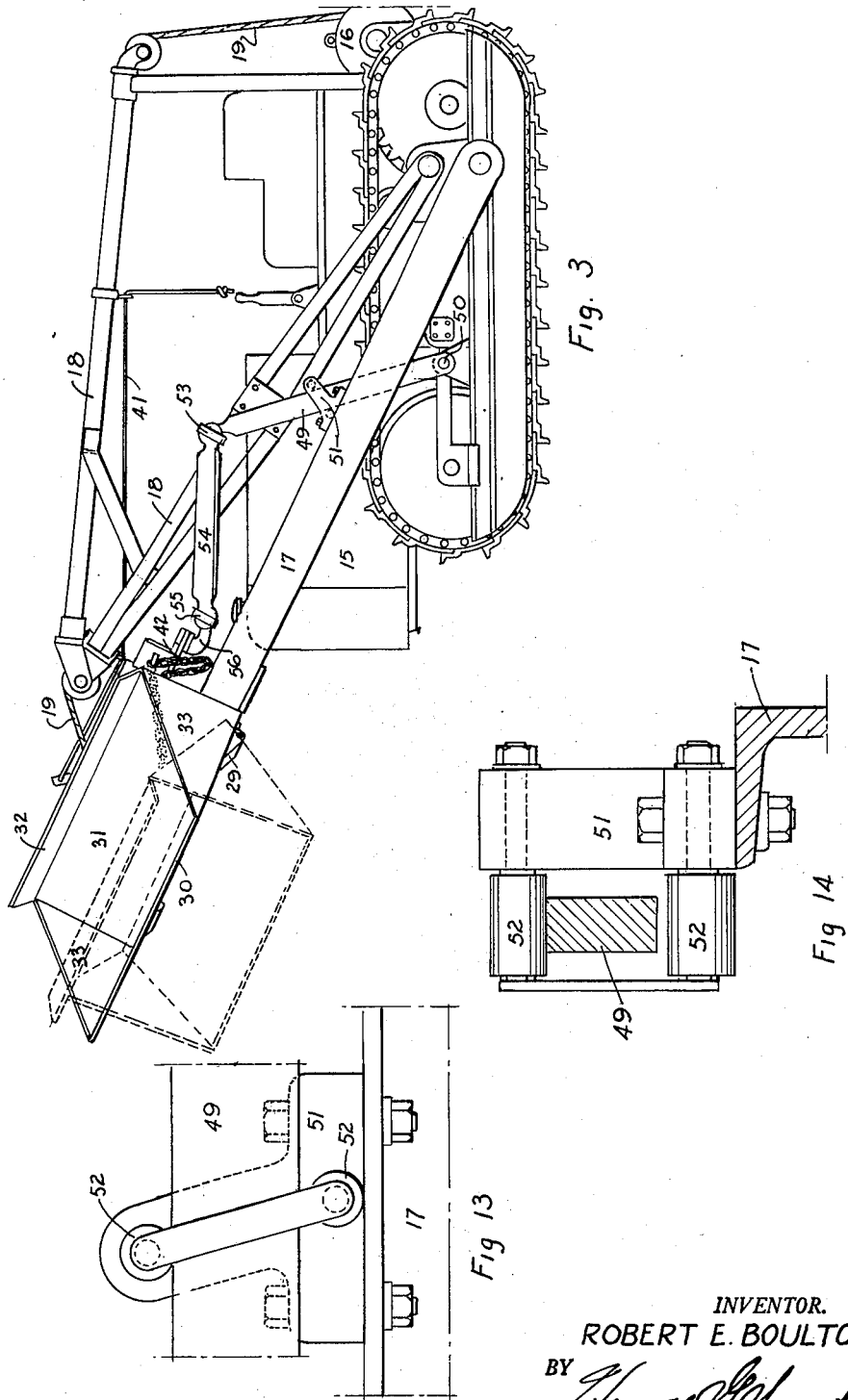

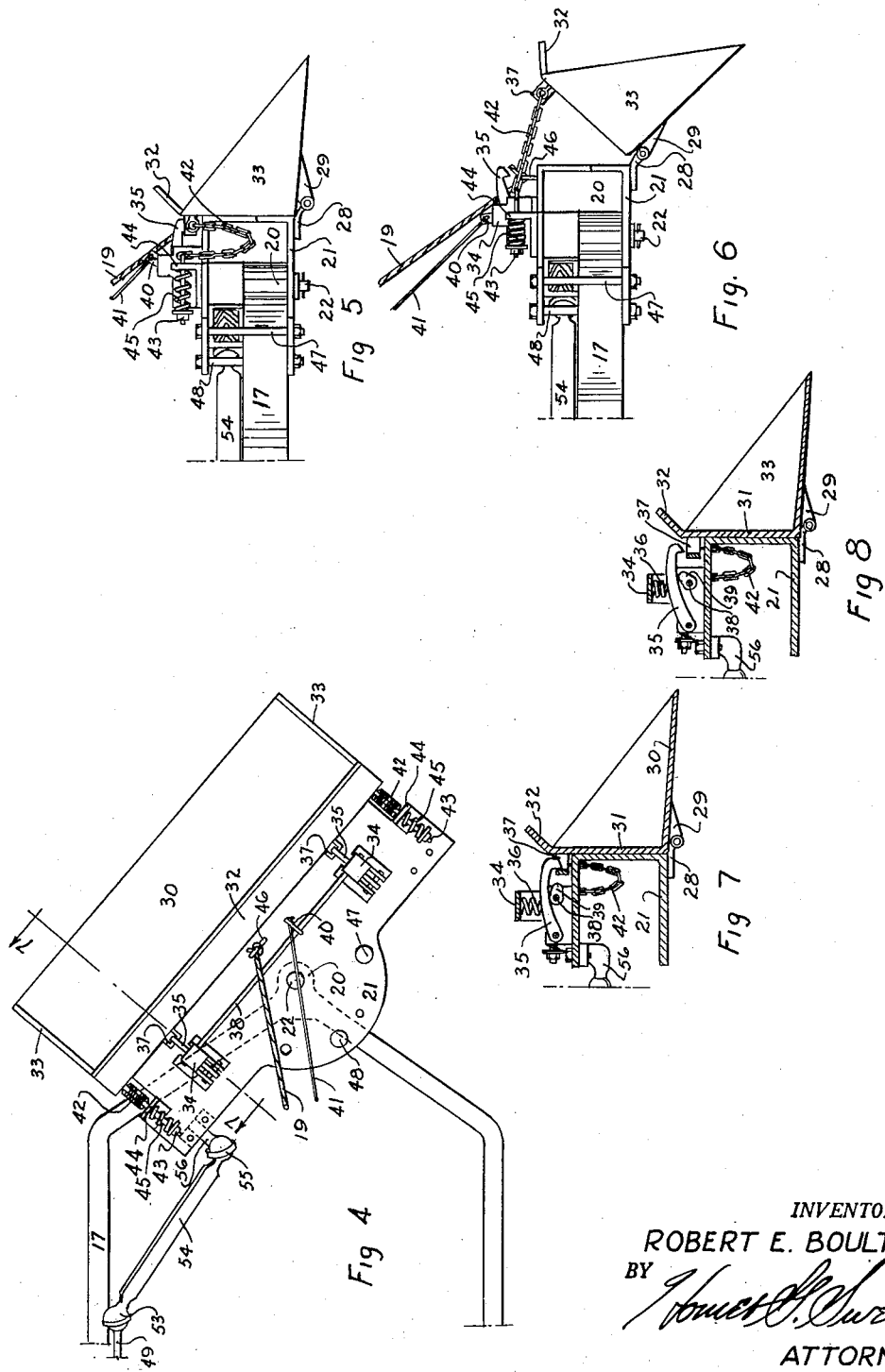

Patented July 11, 1950

2,514,622

UNITED STATES PATENT OFFICE 2,514,622

SIDE-DELIVERY SHOVEL ATTACHMENT FOR TRACTORS

Robert E. Boulton, Rifle, Colo.

Application March 15, 1948, Serial No. 14,855

5 Claims. (Cl. 214—132)

This invention is a development from and improvement over the subject matter of my copending application for Letters Patent of the United States, filed February 12, 1947, Serial No. 727,997 and now Patent No. 2,471,192 granted May 24, 1949, and has as a primary object the provision of an improved construction and operative mounting for a shovel attachment removably and replaceably adaptable to and for use with various types and constructions of conventional tractors.

A further object of the invention is to provide an improved shovel attachment conveniently mountable as a replacement for usual bulldozer blade equipment on and for actuation through the blade-mounting facilities of conventional tractor units.

A further object of the invention is to provide an improved shovel attachment employable as a tractor auxiliary to collect a shovel charge and to deliver the same laterally of the tractor path as an incident of shovel elevation.

A further object of the invention is to provide an improved auxiliary shovel attachment for tractors selectively adaptable to straight-line, forward-dumping, or to laterally-directed, alternative side-dumping, coaction with the associated tractor.

A further object of the invention is to provide an improved construction and unitary assembly of elements constituting an auxiliary shovel attachment for mounting on and cooperation with conventionally-equipped tractors throughout a wide range of tractor size, type, and equipment detail variation.

A further object of the invention is to provide an improved linkage effective to automatically position a pivotally-mounted tractor shovel attachment for delivery of load to one side of the tractor as an incident of shovel elevation.

A further object of the invention is to provide improved means and facilities in a tractor shovel attachment for the selective operative control thereof.

A further object of the invention is to provide an improved auxiliary shovel attachment for tractors applicable in use to accomplish a wide range of particular functions with consequent enlargement of tractor utility, that is simple and inexpensive of manufacture, installation, and use, that is facile and convenient of removal and replacement relative to a tractor for conditioning of the latter for particular operations and for use with other attachments and equipment, that is sturdy, durable, and long-lived in use, and that is characterized by operative novelties and advantages facilitating the consummation of hitherto-difficult and costly operations.

With the foregoing and other objects in view, my invention consists in the construction, arrangement, and combination of elements hereinafter set forth, pointed out in my claims, and illustrated by the accompanying drawings, in which:

Figure 1 is a side elevation of a typical, crawler-type tractor equipped with my improved shovel attachment and showing the latter adjacent a lower limit of its altitudinal range in position for charging. Figure 2 is a plan view of the assembly according to Figure 1, certain elements being broken away to show otherwise concealed construction and the position of certain other concealed elements being indicated by broken lines. Figure 3 is an elevation of the side of the assembly opposite to that shown in Figure 1 illustrating the elements of the improvement as positioned adjacent the upper limit of the shovel altitudinal range ready for side-delivery dumping of the shovel load and showing the alternative, discharging position of the shovel in broken lines. Figure 4 is a fragmentary, plan view of the shovel attachment and its mounting as related in the side-delivery position of Figure 3. Figure 5 is a fragmentary, detail elevation of the shovel attachment and its mounting as related in the charging position of Figure 1. Figure 6 is a view similar to Figure 5 showing the relation of the shovel attachment and mounting elements at the extreme dumping position of the shovel. Figure 7 is a fragmentary, detail section taken substantially on the indicated line 7—7 of the shovel attachment according to Figure 4 as removed and disconnected from its mounting. Figure 8 is a section similar to Figure 7 illustrating an alternative release position of latch elements incorporated in the assembly. Figure 9 is a cross section taken substantially on the indicated line 9—9 of Figure 2. Figure 10 is a cross section taken substantially on the indicated line 10—10 of Figure 2. Figure 11 is an isometric view of a bolster assembly advantageously employable in and with the improved attachment. Figure 12 is a bottom plan view of the arrangement according to Figure 11. Figure 13 is an inner face elevation, on an enlarged scale, of an actuating bracket connection employed in and with the improvement. Figure 14 is an end elevation of the connection shown in Figure 13.

A large number and variety of earth and material handling, moving, excavating, and loading operations incident to construction, farming, ranching, facility maintenance, and the like, are expeditiously and economically accomplished through the use of tractors suitably equipped for the particular undertaking. Tractors of widely-applicable size and type have become commonly available, and it is quite usual practice to equip such power units with altitudinally and angularly adjustable bulldozer blades, shovels, scrapers, and other specifically-desired tools, either as interchangeable tractor attachments or powered auxiliaries permanently associated with the tractor, thus providing a wide range of known equipment available for specific operations. However, certain operations of frequent and wide-spread recurrence, or topographical and other conditions characterizing the site of a given operation, give rise to the need for an altitudinally-actuatable, side-delivery, power shovel on undertakings too limited in scope, or too remote from supply bases, to warrant the construction of a special powered tool or the bringing in of a powered unit adapted to the particular need. Recognizing the general availability of tractors equipped to operatively power altitudinally and angularly adjustable bulldozer blades, the instant invention is directed to the provision of a side-delivery shovel unit for removable and replaceable, operative association with such tractors as an interchangeable substitute for the conventional blades thereof.

In the drawings, a conventional tractor, illustrated as of crawler type but representative of any operatively-effective type, style or construction, wheeled or other, is designated generally by the numeral 15 and shown as conventionally furnished with a power take-off 16, typical of either mechanical or hydraulic such agencies, for the selective power-actuation of organizations apart from the tractor drive. As is customary practice, the tractor 15 is equipped with a yoke-type boom 17 hinged at its open end to frame or rigid track elements of the tractor for actuation about a horizontal axis transversely of the tractor through a vertical arc in projecting relation beyond and embracingly about the tractor forward portion, and a superstructure, or functionally equivalent arrangement, 18 is carried by the tractor for the transmission of power, as through a line 19, from the take-off 16 in a manner to effect selective power actuation of the boom free end through the range of its arcuate travel relative to the tractor. It is to be understood that the take-off 16, superstructure 18, and line 19 are but representative of various means and agencies commonly employed for the selective application of tractor power to effect altitudinal actuation of the boom free end about the boom hinge axis, cnventional such means and agencies varying in form, construction, and type while alike in function. Similarly, the boom 17 may vary in form and construction so far as the purposes and novelties of the invention are concerned, conventional such booms for the support of angularly and altitudinally adjustable bulldozer blades being closely comparable in their provision of paired arms spaced apart to parallel the longitudinal axis of the tractor on opposite sides of the latter, convergent arm forward portions, or equivalent structure, rigidly interconnecting the arm free ends in a forwardly-projecting boss 20 registered on the longitudinal median line of the tractor, and a bore through said boss perpendicular to the plane of the boom for the reception of a mounting pin whereby a blade is secured to, forwardly of, and for angular adjustment relative to the boom. The organization and assembly thus far described is old and well-known in a variety of functionally-identical constructions and in and of itself forms no part of the instant invention, such organization and assembly being illustrated and described merely to typify generally-available powered units and associated equipment whereto and wherewith the improvements of the instant invention are operatively applicable.

In the construction and arrangement of the improved shovel attachment, as shown, a rigid frame member 21, U-shaped in cross section, is provided in a length approximating that of the scoop or bucket to be employed and in a depth between its parallel flanges equal to or exceeding the maximum boss 20 axial length or boom 17 free end depth of equipment wherewith the attachment is likely to be associated. The face of the member 21 is straight, smooth, and plane, and the member flanges project in spaced, parallel registration perpendicularly from opposite long margins of said face a substantial distance, preferably greater than the width of the face, to define a side and end opening channel rectangular in outline and of a depth perpendicular to said face greater than its dimension parallel thereto. The member flange free edge margins parallel the plane of the face for some distance in from the member ends and curve outwardly away from the face plane centrally of the member length to form arcuate webs coplanar with said flanges and extending perpendicularly away from the member face, the free margins of said webs preferably being defined by circular arcs centered on the transverse median line of the member at points correspondingly spaced away from the member face and toward the flange free margins. Holes intersecting the member flanges at the geometric centers of the arcuate webs thereof accommodate a pin 22 mountable therethrough centrally of the member 21 length and in spaced, parallel relation with the member face, so that, the channel of the member 21 being engaged over the forward end of the boom 17 with the member face disposed transversely of and perpendicular to the boom length, the pin 22 may be engaged through the bore of the boom boss 20 and the flange holes registered with opposite ends of said bore and secured against separation from the member 21 to thereby mount said member on, for longitudinal and altitudinal travel with, and for articular adjustment laterally of the boom forward end with the member face spaced forwardly from the associated boom end and transversely perpendicular to the boom length.

Occasions may arise wherein the boss 20 axial length and the dimensions of the boom elements perpendicular to the boom plane are such as to correspond with open depth dimension of the member 21 channel parallel to the member face, in which case operative mounting of said member on the boom is complete with the pin 22 engaged as above described, the member 21 flanges and arcuate webs then engaging with and bearing against the parallel, opposite surfaces of the boom forward end as a support of fifth wheel type supplementing the pin 22 to maintain the member 21 in the desired operative relation with the boom. Alternatively, it may be opportune to associate the member 21 with a boom forward end inadequate to fill the space between the member flanges, in which event it is expedient to employ a variable-thickness bolster of the type shown in Figures 11 and 12 to perfect the mounting. The bolster consists of complementary, flat, segmental plates 23 and 24 of similar outline including a rounded apex adapted to conformably overlie the boom boss 20 for registration of holes therethrough with the bore of said boss, side margins diverging from the apex at an angle preferably less than that between the boom convergent arm forward portions, and arcuate margins closing between the spaced ends of said side margins. Integral flanges outstand perpendicularly from and along the divergent margins of the plates 23 and 24 for telescopic interengagement when said plates are marginally registered in spaced, parallel relation, and an integral, flat lug 25 outstanding perpendicularly from the plate 23 at the midpoint of its arcuate margin is disposed to slidably overlap the outer face of a similar, shorter lug 26 carried by the plate 24. The bolster assembly is completed and its variable thickness determined by a filler block 27, of suitable, readily-workable material, such as wood, dressed in the desired thickness between parallel surfaces to an outline conformably receivable between the plates 23 and 24, and intersected by a hole registrable with the plate holes when the unit is assembled. With its filler block 27 of proper thickness in place between the plates 23 and 24, the bolster assembly is inserted within the member 21 channel to fill the space between either side of the boom forward end and the adjacent member flange in position to register the aligned holes of the bolster with the pin-accommodating holes of the boom boss and member flanges and to clip the bolster lugs 25 and 26 over the inward, convergent connection between the boom forward arms. As so constructed and associated with the boom forward end and member 21, the bolster assembly is traversed by the pin 22 and is held against angular displacement about said pin by the engagement of its lugs between the boom arm forward portions, in which relation it serves to perfect an operative fifth wheel mounting for said member on the boom, while in no way limiting angular adjustment of said member about the pin 22 and relative to the boom forward end within the limits determined by other elements and relationships of the mounting. It is to be noted that the thickness of the filler block 27, and the consequent thickness of the bolster assembly, is susceptible of ready determination and adjustment in the field, thereby advantageously accommodating operative association of the member 21 with available booms of differing forward end thickness.

The member 21 functions as the support and mounting for a hingedly-associated scoop or bucket adapted for manipulation with and by said member, to which end hinge elements 28 are fixed in spaced relation to and project forwardly from the member face lower margin with their pintle axes aligned in forwardly-spaced parallelism with and perhaps slightly below said face lower margin, and complementary hinge elements 29 correspondingly spaced along and fixed to a flat scoop or bucket bottom 30 cooperate with and are pinned to said elements 28 to mount the bottom 30 as a projection forwardly beyond the member 21 face and for actuation through a vertical arc about the hinge axis paralleling said face lower margin. A back wall 31 fixedly or integrally uprises from and along the bottom 30 margin adjacent the member 21 face and at an angle of slightly more than ninety degrees with said bottom, whereby to dispose the latter at a slight forward and downward inclination to the horizontal when the member 21 face is vertical and the wall 31 engaged thereagainst. The back wall 31 has an upward extent from the bottom 30 somewhat greater than the height of the member 21 face and preferably has a free upper marginal portion 32 tilted or inclined forwardly to spacedly overhang the rear area of the bottom 30, and triangular webs 33 close in a usual manner between corresponding end margins of the bottom 30 and wall 31 to complete the scoop or bucket unit. It is to be noted that when the scoop or bucket is in charging position with its back wall 31 bearing against the face of the member 21, such wall and face engagement transmits the operative thrust for loading of the bucket and thereby relieves the hinges 28—29 of much strain, and the angular relation between the bucket bottom 30 and back wall 31 serves to bring the lip of said bottom 30 into ground engagement in advance of other elements of the assembly when the boom forward end is lowered, thus developing a scoop or bucket charging "bite" effective to load the unit as the tractor thrust is forwardly transmitted through the boom 17; forwardly-tapering fillets or webs in the hinge elements 29 immediately in advance of the hinge bosses protecting the latter against damage during charging operations. Further, as clearly appears in Figure 6, disposition of the scoop or bucket hinge axis in advance of the member 21 face lower margin is productive of a clearance or open space between said face and the heel of the scoop or bucket when the latter swings to its load-dumping position, such clearance being of operative significance in that it permits and facilitates escape of any otherwise entrapped material that might lodge behind and complicate return of the back wall 31 to its bucket-charging position.

Fixedly upstanding from and inwardly adjacent the ends of the member 21 upper flange, a pair of like yoked brackets 34 each hingedly mounts a latch bar 35 for actuation in a vertical arc with its free end adjacent the member 21 face upper margin, and a spring 36 operatively engaged between each bar 35 and associated yoke 34 elements functions to yieldably urge its bar to the downward limit of its range of travel. Forward ends of the bars 35 are beveled and hooked, substantially as shown, for latching engagement with loops 37 fixedly projecting rearwardly from the back wall 31 portion above the member 21 face in alignment with said bars; the arrangement being such as to automatically engage the latch bar end hooks with the loops 37 when the back wall 31 is swung into engagement against the member 21 face, thereby retaining the scoop or bucket in its charging relation with the member 21. A trip rod 38 is journaled at its ends through the brackets 34 beneath the bars 35 and extends in bridging relation between said brackets, cams 39 being fixed to said rod beneath and for elevation of said bars as an incident of rod rotation, and a trip arm 40 fixedly projecting perpendicularly from an intermediate portion of the rod 38 connects with one end of a flexible line 41 which leads through suitable elements of the superstructure 18 to within convenient reach of the tractor operator. With the arrangement shown and described, the weight of the trip arm 40 and the pressure of the springs 36 acting against the bars 35 operate to normally hold the cams 39 in a position of minimum bar elevation where they serve to limit downward travel of said bars and hold the hooked free ends of the latter in latching relation with the positions of the loops 37. The bucket or scoop being in dumping position forwardly away from the face of the member 21, sudden drop of the yoke 17, or engagement of the bottom 30 lip against the ground or other fixed surfaces, operates to oscillate the scoop or bucket about its hinge mounting and into engagement of the back wall 31 against the member 21 face, such travel of the back wall moving the loops 37 beneath and into latched engagement with the bar 35 hooked ends. With the pressure of the springs 36 acting against the bars 35, the latter remain latched to the loops 37, holding the scoop or bucket in its charging position, until the rod 38 is rotated by means of the line 41 and arm 40, such rotation, transmitted through the cams 39, operating to elevate the bars 35 to withdrawal of their hooked free ends from the loops 37 and thus permitting the scoop or bucket to swing away from the member 21 face and into its dumping position.

Separation of the scoop or bucket back wall 31 from the member 21 face, and consequent dumping inclination of the bottom 30, is limited by means of like lengths 42 of flexible, non-extensible material, such as link chain, connecting between upper, outer corners of said back wall and suitably-related elements fixed to the member 21. It being expedient to minimize the shock incident to sudden checking of the scoop or bucket dumping travel, an arrangement for such purpose is illustrated as comprising a direct connection of each length 42 at one end to and behind each back wall 31 upper, outer corner, an eye-bolt 43 attached to the other end of each said length, an apertured lug 44 fixedly upstanding from the member 21 upper flange in rearwardly-spaced, longitudinally-aligned relation with the fixed end of the associated length 42 for slidable reception of the eye-bolt 43 shank, and an expansive coil spring 45 surrounding the eye-bolt shank in end-bearing engagement between the rear face of the lug 44 and a flange or washer mounted on the end of said bolt 43 remote from its eye; said springs 45 normally retaining the eye-bolts 43 retracted away from the scoop or bucket for determination of minimum desired back wall 31 and member 21 face separation as established by the lengths 42 and resiliently yielding to shock transmitted through the fully-extended lengths to accommodate transient extension of the eye-bolts 43 forwardly relative to their mounting lugs 44 and to cushion such shock. Operative play of the lengths 42 is accommodated through end-opening notches intersecting the member 21 upper flange and face forwardly of each lug 44.

In organizations of the type illustrated, wherein the boom 17 is actuated about its hinge axis by means of the line 19, an eye 46 fixed to the member 21 upper flange and rising above the transverse median line thereof provides a convenient point of attachment for said line in an operatively customary and usual manner.

The attachment thus far described is operable as a forward-dumping, altitudinally-actuatable shovel applicable to loading, excavating, levelling, and like functions when associated with a typical tractor and boom in the manner set forth and when held against oscillation laterally of the boom about the mounting pin 22. To selectively secure the attachment against oscillation relative to the boom and in a forward presentation of its scoop or bucket with the lip of the latter perpendicular to the tractor longitudinal axis, registered holes are formed in the member 21 upper and lower flanges to position pins 47 engaged therethrough in bearing engagement against forward surfaces of the boom converging forward arm portions, a registered pair of such holes being provided on each side of the attachment transverse center line for the reception of such pins, so that when a pin 47 is in place in each set of holes the member 21 is locked against angular adjustment about the pin 22. Adjacent the crown apices of the member 21 flange arcuate webs, registered holes intersecting said webs accommodate a pin 48 fixedly, but movably, interconnecting said webs between the boom converging forward arm portions as a brace and stress member; said pin 48 also serving as a stop for limiting angular displacement of the attachment relative to the boom, as will hereinafter appear.

An important novel feature of the invention is the provision of means automatically operable as an incident of boom elevation to swing the shovel attachment about the pin 22 and into position for dump discharge of the scoop or bucket contents to the side of the tractor travel path; such means being arranged for selectively alternative disposition determinative of the direction of shovel angular displacement. The shovel-oscillating means includes a rock lever 49 hinged at one end to a pin or stub shaft 50 fixedly projecting laterally from a rigid tractor element, such as a frame or track carriage portion, forwardly and upwardly from the hinge axis of the boom 17. The axis of the pin 50 parallels the boom hinge axis to dispose the lever 49 for oscillation in a plane paralleling that of the adjacent boom arm and is arranged to lie, together with its lever 49, inwardly adjacent one of the boom arms, a pin 50 being provided on each side of the tractor or one such pin being arranged for alternative association with the tractor sides, and the altitudinal relation of the pin 50 axis to the boom hinge is preferably such as to dispose the arm 49 to inwardly and upwardly parallel the adjacent boom arm when the latter is approximately horizontal. Forwardly from the pin 50, a bracket 51 fixed to the upper side of the adjacent boom arm rigidly supports an inwardly-directed yoke adapted and in position to loosely embrace an intermediate portion of the lever 49, said yoke preferably comprising like, spacedly-parallel, upper and lower rollers 52 strut-linked at their inner ends in a spacing of their adjacent surfaces exceeding the width or vertical dimension of the lever 49. Thus, as the boom arm carrying the bracket 51 moves upwardly, elevation of the bracket yoke in embracing relation with the lever 49 oscillates said lever about its hinge connection with the pin 50 to elevate the lever free end more rapidly than the boom end is elevated and to cause said lever to approach the vertical when the boom free end approaches its maximum elevation, the spacing between the yoke arms or rollers 52 accommodating the varying angular width dimensions of the lever engaged therebetween during such operation; descent of the boom arm correspondingly acting through the bracket 51 and its yoke to return the lever 49 to a position of approximate parallelism with the lowered boom member.

The free end of the lever 49 connects through the agency of a universal joint 53, preferably of ball and socket type, with the rearward end of a rigid link 54 which in turn connects at its forward end through a second universal, or ball and socket, joint 55 with an arm of an L-shaped bracket 56 fixedly securable to and beneath an outer, rearward corner of the member 21 upper flange, said bracket 56 being interchangeable of location on said member upper flange to align with the mounted position of the lever 49. The lever 49, link 54, joints 53 and 55, and bracket 56 have a combined length, when extended in alignment to parallel the lowered, or approximately horizontal, position of an associated boom arm, effective to operatively span between the pin 50 whereon the lever 49 is mounted and the longitudinally-aligned member 21 upper flange rearward outer corner of the shovel attachment when the shovel lip is perpendicular to the tractor longitudinal axis, and to cooperate in such position of the apparatus elements to brace the shovel attachment against angular displacement about the pin 22 toward the tractor side carrying the lever 49. Given a certain mounting of the pin 50 relative to the boom hinge axis, the relative lengths of the lever 49 and link 54, as well as the position of the bracket 51 on the boom arm, are determined to effect maximum lateral swing of the attachment about its pin 22 when the boom 17 attains its maximum free end elevation, or, conversely, such maximum attachment swing in a given intallation of predetermined link and lever lengths, determines the point of pin 50 mounting and the position of the bracket 51 on the boom arm. The pin 47 on the side of the attachment carrying the bracket 56 having been removed, the swing of the attachment to the corresponding side of the assembly is limited by engagement of the corresponding member 21 face end against the converging boom arm forward portion therebehind, or by the engagement of the pin 48 with the rearward face of the opposite forward arm portion, which latter stop may be adjusted through the provision of a plurality of web holes to accommodate maximum swing, and the disposition of the member 21 face forwardly from the pin 22, together with a boom journal for said pin advanced to or beyond the apex of boom arm convergence, contributes to an enlargement of attainable attachment swing.

With the pin 48 properly located and secured, the pin 47 on the same side of the assembly as the lever 49 removed, the pin 47 on the opposite side of the attachment in place, and the shovel-oscillating elements connected and arranged as shown and described, it is apparent that a lowered condition of the boom extends the elements 49, 54 and 56 in bracing alignment between the pin 50 and the associated end of the shovel attachment in a manner to dispose the shovel lip substantially perpendicular to the tractor longitudinal axis, the pin 47 engaged with the adjacent boom forward arm portion to inhibit rearward travel of the attachment end remote from the oscillating linkage, and to thereby condition the shovel for charging as an incident of tractor forward travel in a usual manner. The scoop or bucket having been charged, elevation of the boom lifts the charged attachment, simultaneously actuates the oscillating linkage to swing the attachment towards the tractor side carrying said linkage, and tilts the oscillatory axis of the attachment away from the vertical in a manner to lower the retracted end and to elevate the forwardly-projected end of the scoop or bucket when and as the latter is swung to the side, so that release of the elevated scoop or bucket to dumping position through the agency of the trip line 41 and mechanism reactive thereto results in a laterally-directed cascade of charge through the lower and outward corner of the shovel.

Through the provision of brackets 51 for each side of the tractor boom and alternate side arrangements for mounting of the pin 50 and bracket 56, shift of the oscillating linkage to effect shovel charge delivery to either side of the assembly is a simple and rapid operation susceptible of accomplishment in the field, and the shiftability of the pins 47 and 48, another simple field operation, facilitates adaptation of the improvement to particular uses and enhances the convenience, flexibility, and effectiveness of the assembly.

Since changes, variations, and modification in the specific form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. In a shovel unit attachment for tractors having a boom hinged for actuation through a vertical arc about an axis extending transversely of the tractor and a member directly and hingedly mountable on the boom free end for oscillation about an axis perpendicular to the boom hinge axis, means for oscillating said attachment as an incident of boom actuation, said means comprising a link hinge axis fixed to said tractor forwardly and upwardly from and parallel to the boom hinge axis, a jointed link operatively connected between said link hinge axis and the laterally-corresponding outer end of said member, and a yoke fixed to said boom in slidably-embracing relation with the link section remote from said member, whereby elevation of the boom acts through said yoke to more rapidly elevate the link joint and consequently retract the member end whereto the link connects.

2. In a shovel unit attachment for tractors having a boom actuatable through a vertical arc about an axis extending transversely of the tractor and a member directly and hingedly mountable on the boom free end for oscillation about an axis perpendicular to the boom hinge axis, means for oscillating said attachment as an incident of boom actuation, said means comprising a link hinge axis fixed to one side of said tractor forwardly and upwardly from and parallel to the boom hinge axis, a rock lever engaged at its rearward end with said link hinge axis to spacedly parallel the boom when the latter is adjacent a lower limit of its operating range, a yoke fixed to said boom in slidably-embracing relation with an intermediate length portion of said rock lever, and a rigid link between and swivelled at its ends to the rock lever forward end and the laterally-corresponding outer end of said member, the lengths of said rock lever and link being proportioned to align with consequent disposition of said member parallel to the boom hinge axis when said boom is in its lower operating range and to angularly diverge for retraction of the member and engaged by said link toward the boom hinge axis as said boom is elevated.

3. In a shovel unit attachment for tractors having a boom actuatable through a vertical arc about an axis extending transversely of the tractor, an attaching eye on the boom free end perpendicular to the boom hinge axis, and a unit rigid member connectible at its midlength to said boom eye, a rectangular plane face on said rigid member operatively disposable in advance of and to parallel the boom eye axis, a shovel element including bottom and back wall components fixedly and marginally interengaged to diverge at an angle slightly exceeding a right angle, and a hinge linking the shovel element bottom to said member for oscillation about an axis forwardly paralleling the member face lower margin; whereby to dispose said element for charging at one limit of its range of oscillation with its back wall bearing against the member face and its bottom projected forwardly from and at a slight inclination downwardly from the perpendicular to said face, and to open clearance between the member face and adjacent shovel element components when said element is oscillated relative to and for separation of its back wall from said face.

4. In a shovel unit attachment for tractors having a boom actuatable through a vertical arc about an axis extending transversely of the tractor, an attaching eye on the boom free end perpendicular to the boom hinge axis, and a unit rigid member connectible at its midlength to said boom eye, a rectangular plane face on said rigid member operatively disposable in advance of and to parallel the boom eye axis, a shovel element hinged at its bottom on an axis fixedly and forwardly paralleling the member face lower margin and including a back wall disposed to bear against said member face at one limit of element oscillation, and flexible, non-extensible connections of like length each fixedly engaged at one end with an upper, outer corner of the shovel element back wall and through a resiliently-yieldable attachment at the other end with a corresponding corner of said member to limit shovel element oscillation away from said member face.

5. In a shovel unit attachment having a rigid member connectible at its midlength to and for oscillation about the axis of a tractor boom eye perpendicular to the boom hinge axis, means for the automatic oscillation of the member about the boom eye axis as an incident of boom actuation, said means comprising a bracket alternatively connectible with and to extend rearwardly from the upper, outer corners of said member, a pin mountable on either side of a tractor above and forwardly from the boom hinge axis in axially-parallel relation with the latter, a rock lever hinged at one end to said pin to extend forwardly therefrom in substantial parallelism with lower range positions of the boom, a yoke connectible with the boom in slidably-embracing relation with an intermediate portion of the rock lever length, and a rigid link end-swivelled to and interconnecting said bracket and rock lever end remote from said pin.

ROBERT E. BOULTON.

REFERENCES CITED

The following references are of record in the file of this patent:

UNITED STATES PATENTS

| Number | Name | Date |
|---|---|---|
| 798,246 | Wolfe | Aug. 29, 1905 |
| 2,173,158 | Corbett | Sept. 19, 1939 |
| 2,181,760 | Le Bleu | Nov. 28, 1939 |
| 2,387,764 | Maxwell | Oct. 30, 1945 |
| 2,417,595 | Heath | Mar. 18, 1947 |
| 2,445,076 | Munson | July 13, 1948 |
| 2,471,192 | Boulton | May 24, 1949 |